(12) United States Patent
Lallemant et al.

(10) Patent No.: US 9,458,797 B2
(45) Date of Patent: Oct. 4, 2016

(54) SECURED DOUBLE-CHANNEL CONTROLLING DEVICE FOR AUTOMOBILE ENGINE

(71) Applicant: Valeo Systemes de Controle Moteur, Cergy Pontoise (FR)

(72) Inventors: Mathieu Lallemant, Maisons-Laffitte (FR); Franck Girardon, Conflans Sainte Honorine (FR); Patrick Lebrasseur, Montagny en Vexin (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 187 days.

(21) Appl. No.: 14/367,074

(22) PCT Filed: Dec. 17, 2012

(86) PCT No.: PCT/FR2012/052951
§ 371 (c)(1),
(2) Date: Jun. 19, 2014

(87) PCT Pub. No.: WO2013/093312
PCT Pub. Date: Jun. 27, 2013

(65) Prior Publication Data
US 2014/0345566 A1   Nov. 27, 2014

(30) Foreign Application Priority Data

Dec. 21, 2011   (FR) .................................... 11 62187

(51) Int. Cl.
*F02D 9/00* (2006.01)
*F02M 15/02* (2006.01)
(Continued)

(52) U.S. Cl.
CPC .......... *F02M 15/02* (2013.01); *F02B 29/0418* (2013.01); *F02D 2009/0277* (2013.01); *F02D 2009/0279* (2013.01); *Y02T 10/121* (2013.01); *Y02T 10/146* (2013.01)

(58) Field of Classification Search
CPC .. F02M 15/02; F02M 31/06; F02B 29/0418; F02B 29/04; F02D 2009/0279; F02D 2009/0277; F02D 9/109; F02D 11/04; Y02T 10/146; Y02T 10/121
USPC ....... 123/399, 400, 337, 336, 302, 308, 542, 123/556, 568.12, 568.17, 568.18, 568.19
See application file for complete search history.

(56) References Cited

U.S. PATENT DOCUMENTS 2,473,808 A * 6/1949 Mallory ................. F02M 31/08
123/545
7,267,139 B2 * 9/2007 Blomquist ............ F02D 9/1065
123/568.24

(Continued)

FOREIGN PATENT DOCUMENTS

| EP | 1923551 A2 | 5/2008 |
|---|---|---|
| EP | 2 208 875 A1 | 7/2010 |
| FR | 2 926 114 A1 | 7/2009 |

OTHER PUBLICATIONS

International Search Report issued in PCT/FR2012/052951 mailed on Feb. 26, 2013 (4 pages).

*Primary Examiner* — Hai Huynh
(74) *Attorney, Agent, or Firm* — Osha Liang LLP (57) ABSTRACT

A device for dosing inlet fluid in an engine and for regulating the temperature thereof is disclosed. The device has a dosing body on which a first and a second circulation channel are arranged. First and second movable flow dosage flaps are arranged in the circulation channels. The dosing body also includes an actuator motor and a kinematic capable of actuating the first and/or the second flap. The device additionally includes first and second tubes, at least one of the tubes having a means for modifying the temperature of the fluid. The kinematic is shaped so as to position at rest, if flap actuation is lost, the first flap of the cool channel being then in a fully open position and the second flap of the hot channel being then in a fully closed position.

10 Claims, 7 Drawing Sheets

(51) Int. Cl.
*F02B 29/04* (2006.01)
*F02D 9/02* (2006.01)

(56) References Cited

U.S. PATENT DOCUMENTS

| | | | | |
|---|---|---|---|---|
| 8,381,520 B2* | 2/2013 | Leroux | ............. | F02M 25/0709 123/568.15 |
| 8,539,932 B2* | 9/2013 | Ramappan | ............ | F02D 41/064 123/179.18 |
| 8,561,645 B2* | 10/2013 | Leroux | ............. | F02M 25/0709 123/568.24 |
| 8,862,369 B2* | 10/2014 | Vitiello | ................... | F02D 11/10 123/568.12 |
| 9,145,854 B2* | 9/2015 | Hodebourg | ......... | F02D 41/0077 |
| 2009/0235903 A1* | 9/2009 | Yang | ......................... | F02B 1/12 123/543 |
| 2010/0162994 A1* | 7/2010 | Elsäßer | ................ | F02B 29/083 123/337 |
| 2014/0360462 A1* | 12/2014 | Lallemant | ........... | F02B 29/0418 123/336 |

* cited by examiner

SECURED DOUBLE-CHANNEL CONTROLLING DEVICE FOR AUTOMOBILE ENGINE

The present invention concerns the automotive field and, more particularly, the field of engine supply equipment.

A motor vehicle heat engine comprises a combustion chamber, generally formed by a plurality of cylinders, in which a mixture of fuel and air is burned to generate the work of the engine.

Arrangements are known in which the intake fluid flow, comprising the air necessary for the operation of the engine, is divided between two conduits. One of the conduits carries a device for cooling this fluid, whereas the other does not comprise such a device. These two conduits then meet each other at the engine inlet. A controlling device can thus vary the temperature of the intake fluid before said fluid is introduced into the cylinders, depending on whether more fluid is supplied via the channel that passes through the cooler, referred to as the cooled channel, or via the channel that bypasses the cooler, referred to as the bypass channel or uncooled channel. The controlling device thus makes it possible to manage both the amount of fluid admitted into the cylinders and the temperature of this fluid.

In the prior art, this controlling device was first embodied in the form of two single throttles, which receive information from the engine controller and which open their flap to a greater or lesser extent with the aid of a position-controlled actuator. They also have the further function of ensuring the stopping of the engine, on a specific command, by switching their flaps into a fully closed position, which chokes the engine. In their rest position, that is to say the position assumed by the flaps in the case of failure of the control unit or in the absence of reception of an instruction, the flaps are placed automatically in an open position under the effect of a return spring. These devices have the following disadvantages: they utilize two components, they require two control systems with the associated connections, which substantially increases their cost, and they complicate the dosage control system for ensuring the simultaneity of the two throttles.

A first improvement has been provided with the creation of double throttles which combine the two flaps and the control of the positioning thereof within one component. Such a device is described in patent application WO 2007 125205 in the name of the applicant, which presents a double throttle of which the mechanism is actuated by a common motor. In this application document, one of the flaps, in normal operation, doses intake fluid, the second flap remaining closed; in a secondary mode, the first flap is closed, whereas the second flap remains fully open.

Since these devices offer a number of possibilities for the controlling of the flow and for the temperature of the intake fluid, it is important to integrate this equipment in the global intake control system of the engine by selecting a configuration that, whilst satisfying the requirements of desired performance, ensures a safety of the intake system in the case of failure of the actuator motor. The present invention thus proposes various technical embodiments responding to this problem.

To this end, the invention relates to a device for feeding intake fluid for an internal combustion engine, said device comprising:
- a throttle, equipped with a throttle body in which a first channel and a second channel for circulating said intake fluid are arranged, in which first and second movable sealing flaps are positioned for controlling the flow passing through said circulation channels, said throttle further comprising a motor for actuating said flaps and a kinematic able to actuate the first flap and/or the second flap in response to a rotation of said motor,
- a cooler connected to one of the circulation channels of the throttle, referred to as the cooled channel.

Said device is also configured to connect the other circulation channel of the throttle, referred to as the hot channel, to the heat engine without passing through the cooler.

In accordance with the invention, the kinematic is designed to ensure, in the case of loss of actuation of the flaps by the actuator motor, that said flaps are switched to a rest state, the flap of the cold channel then being in a fully open position and the flap of the hot channel then being in a fully closed position. Such a position of the flaps ensures that the engine of the vehicle is made safe by the double throttle in the case of failure of the actuator motor 9, in particular if the failure occurs during a case of intensive use of the engine of the vehicle.

In accordance with different embodiments of said device, which can be considered in combination or separately:
- the kinematic is designed to ensure that, starting from said rest position and in response to a rotation in a first direction of said drive motor, the cold channel is closed simultaneously with an opening of the hot channel, thus providing 'proportional' controlling,
- the kinematic is designed to ensure that, in response to a continuation of the rotation in the first direction of said drive motor, the hot channel is closed whilst the cold channel is kept closed, thus providing a controlling of the intake fluid at the temperature of the hot channel,
- the kinematic is designed to ensure that, starting from said rest position and in response to a rotation in a second direction, opposite the first direction, of said drive motor, the cold channel is closed whilst the hot channel remains closed, thus providing a controlling of the intake fluid at the temperature of the cold channel,
- the kinematic is designed to ensure a constant total flow during said proportional controlling,
- the kinematic is designed so as to bring at least one of the two flaps into a closed position in accordance with two positions—one corresponding to a reversal of said flap with respect to the other,
- the actuator motor, by means of a drive pinion, drives two gearwheels meshing with one another, the drive pinion of the actuator motor meshing with one of said gearwheels, at least one first gearwheel carrying a drive finger designed to drive in rotation a first plate connected fixedly to the spindle of one of said flaps, by means of a return spring,
- said first plate comprises a dead range in its cooperation with the corresponding drive finger, said dead range corresponding to the actuation by the actuator motor of the flap driven by the second gearwheel, the flap associated with the first gearwheel remaining stationary,
- the actuator motor drives two gearwheels forming a sun gear and an annular gear for an epicyclic gear train, the rotation of the components of said epicyclic train being ensured by an element actuated by the actuator motor and said element acting against a single return spring carried by said throttle.

The invention also relates to an air intake module for an internal combustion engine, comprising a device as claimed in one of the preceding claims.

The invention will be better understood, and further objectives, details, features and advantages of the invention will become clearer, upon reading the following detailed explanatory description of a number of illustrative non-limiting embodiments of the invention given merely by way of example, with reference to the accompanying schematic drawings.

Figure 1:
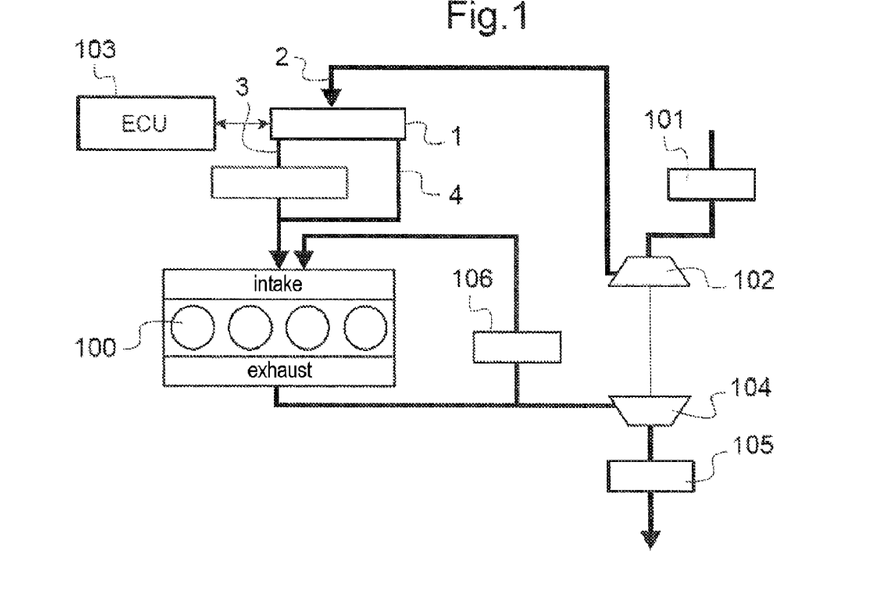
FIG. 1 is a schematic view of an arrangement for high-pressure supply of a turbocharged engine.

With reference to FIG. 1, the circuit for supplying air to the cylinders 100 of a turbocharged internal combustion engine for a motor vehicle can be seen. The air, drawn from outside, passes into an air filter 101, then is compressed by the compressor 102 of the turbocompressor, which sends the air into a double throttle, which forms the subject of the invention. The body 1 of the double throttle has an inlet channel 2, via which the air coming from the compressor passes, and two outlet channels 3 and 4. The throttle receives orders for the controlling of the air between these two channels from a controller 103, referred to as an ECU (electronic control unit). These orders are executed in the form of a displacement of flaps, which close the channels 3 and 4 to a greater or lesser extent under the action of an electric actuator motor (not shown) and an appropriate kinematic, which are both integrated in the body of the double throttle. A heat exchanger or cooler 5 is mounted on one of these channels, referred to as the cooled channel 3, whereas the other channel, referred to as the bypass channel or uncooled channel or hot channel 4, is connected directly to the intake pipes of the engine. By varying the distribution of the air between the two channels, which meet each other upstream of the intake pipes, it is thus possible to regulate the temperature at the intake of the engine.

At the output of the cylinders of the engine, the burned gases are directed to the exhaust circuit and pass into the turbine 104 of the turbocompressor, which removes some of the residual energy of said gases so as to actuate the corresponding compressor 102. These exhaust gases then usually pass through a particulate filter and/or a catalytic converter 105 before being discharged from the vehicle.

In the case of a high-pressure arrangement, as is shown in FIG. 1, some of the exhaust gases are recycled, via a high-pressure valve 106 arranged upstream of the turbine 104, into the intake circuit downstream of the junction of the two outlet channels 3 and 4.

Figure 2:
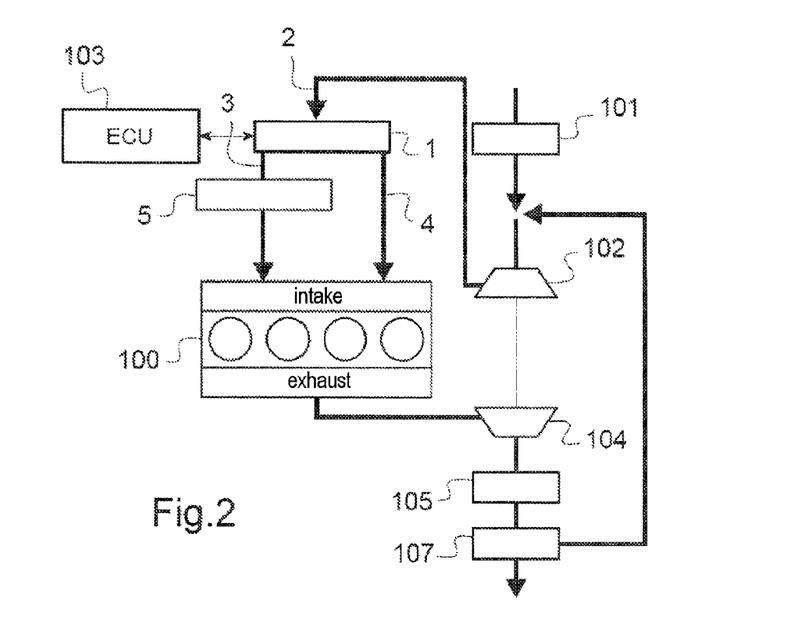
FIG. 2 is a schematic view of an arrangement for low-pressure supply of a turbocharged engine.

In the case of a low-pressure arrangement, as shown in FIG. 2, the same elements as in a high-pressure arrangement are used, however the recycled portion of the exhaust gases is removed downstream of the turbine 104 and is re-injected, via a low-pressure valve 107, upstream of the compressor 102 of the turbocompressor. The fluid that circulates in the intake circuit then is not only formed of air, but a mixture of air and exhaust gases. The operation of the double throttle remains the same, however, in the two arrangements.

Figure 3:
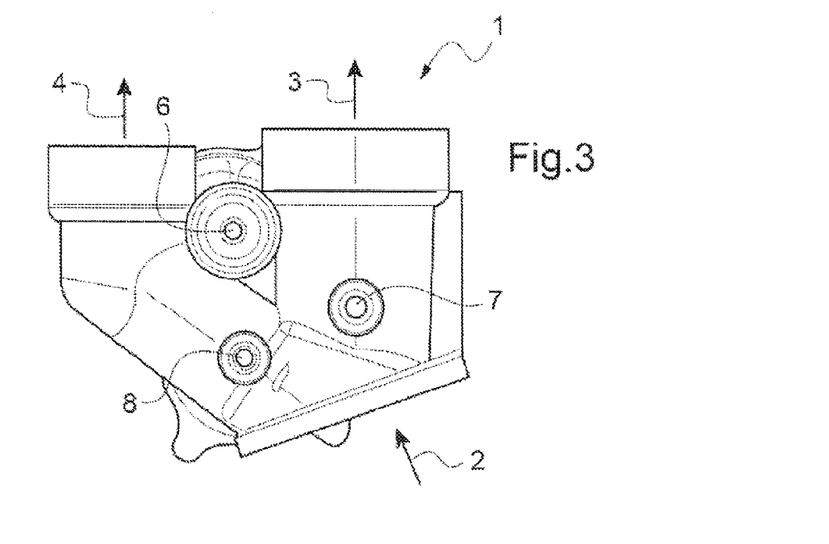
FIG. 3 is a front view of a double throttle according to the invention for the supply circuit of a turbocharged engine.

With reference now to FIG. 3, the body 1 of a double throttle can be seen, with the inlet channel 2 and the two outlet channels 3 and 4. The first outlet channel 3 is intended for connection to a cooler 5, whereas the second channel 4 is intended to bypass this cooler so as to directly meet the intake pipes. Each of the two channels 3 and 4 is controlled via a flap movable about a spindle mounted in a spindle support 7 for the first channel and 8 for the second. The controlling over each channel is performed via the rotation of the flap, which obstructs to a greater or lesser extent the flow of air or of gas that passes through the corresponding channel. The body 1 also comprises a support 6 for the electric motor for actuating the two flaps, to which these flaps are connected via a suitable kinematic. The electric actuator motor 9 receives instructions from the ECU 103 so as to place the flaps in the desired position.

Figure 4:
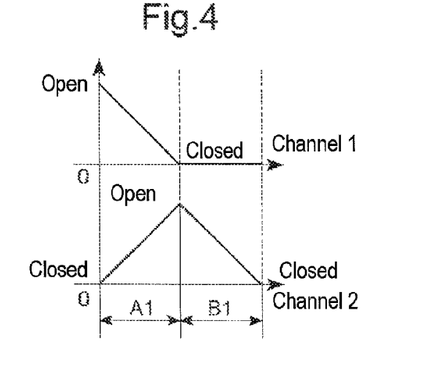
FIG. 4 is a schematic view of the operation of the invention in a first embodiment.
Figure 5:
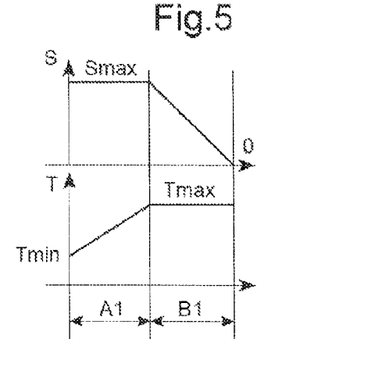
FIG. 5 shows the evolution of the cross section of the double throttle and of the temperature of the intake fluid in the embodiment of FIG. 4.

With reference now to FIGS. 4 and 5, the relative evolution of the positioning of the two flaps, under the action of a command from the actuator motor of the double throttle, and of the drive kinematic of the two flaps 10 and 20 in a first embodiment can be seen. The abscissa corresponds to the course of the actuator motor from its neutral position to its full deflection, and the position of the ordinate corresponds to the rest position of the flaps. In relation to this rest position, the actuator motor is able, here, to drive gearwheels of the kinematic in a rotation of size $2\alpha$, by passing through all the desired positions for the flaps by a rotation in just one direction, and to return to the rest position by a rotation in the opposite direction. In this rest position, the flap 10 of the first channel 3 is open, whereas the flap of the second channel 4 is closed.

A rotation of gearwheels by an angle α, represented by the branch A1 in the figures, drives simultaneously a closure of the flap 10 of the first channel and an opening of the flap 20 of the second channel. The continuation of the rotation, by a second angle α, represented by the branch B1, drives a closure of the flap 20 of the second channel, whilst the flap 10 of the first channel remains closed. FIG. 5 describes, on the one hand, the impact of these movements on the effective area of the throttle for the passage of the intake fluid in the two channels, and therefore on the controlled flow, and, on the other hand, the influence that these movements have on the temperature of the fluid at the entry into the cylinders, downstream of the confluence of the two channels. This figure corresponds to a configuration in which the first channel is a cooled channel 3 and in which the second channel is an uncooled channel 4.

The branch A1 corresponds to a regulation of the temperature of the fluid, without controlling of the volume thereof. Although not obligatory, the kinematics for opening and closing the two flaps are shown here as compensating for one another mutually, which makes it possible to obtain a constant output flow for all the positions of the branch A1. The branch B1 corresponds to a controlling of the flow over just the second channel and therefore to a controlling of the flow of fluid at uncooled temperature, which makes it possible to finely vary the quantity of air admitted into the engine.

Figure 6:
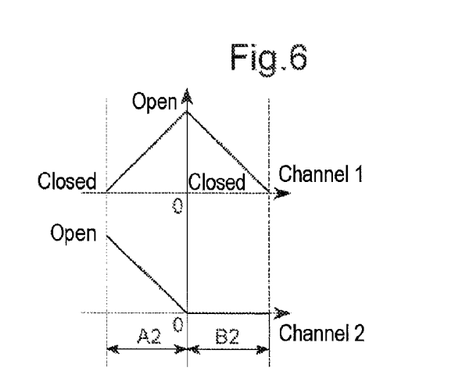
FIG. 6 is a schematic view of the operation of the invention in a second embodiment.
Figure 7:
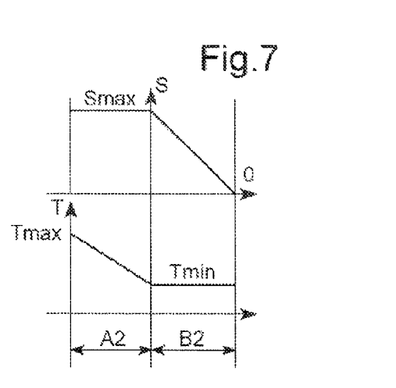
FIG. 7 shows the evolution of the cross section of the double throttle and of the temperature of the intake fluid in the embodiment of FIG. 6.

Likewise, FIGS. 6 and 7 show the relative evolution of the positioning of the two flaps, under the action of a command from the motor actuating the double throttle and of the kinematic driving the two flaps 10 and 20 in accordance with a second embodiment. The abscissa, as before, corresponds to the course of the actuator motor, which evolves here in one direction or the other from its neutral position. As before, the position of the ordinate corresponds to the rest position, that is to say to the position assumed by the flaps 10 and 20 in the case of a loss of drive thereof by the actuator motor. Compared with this rest position, the actuator motor is able to drive the gearwheels in a negative rotation of size −α, or in a positive rotation of size α. Here again, the flap 10 of the first channel 3 is open in the rest position, whereas the flap of the second channel 4 is closed.

A rotation of the gearwheels through an angle −α from the rest position, shown by the branch A2 in the figures, drives a closure of the flap 10 of the first channel and simultaneously an opening of the flap 20 of the second channel. The rotation through an angle +α, shown by the branch B2, drives a closure of the flap 10 of the first channel, the flap 20 of the second channel remaining closed.

With regard to FIG. 7, this figure, as before, describes on the one hand the impact of these movements on the effective area of the throttle for the passage of the intake fluid in the two channels, and, on the other hand, the influence that these movements have on the temperature of the fluid at the entry into the cylinders, downstream of the confluence of the two channels. The branch A2 corresponds to a regulation of the temperature of the fluid, without controlling of the volume thereof, the kinematics for opening and closing the two flaps being shown here as compensating for one another mutually. The branch B2 corresponds to a controlling of the flow over just the first channel and therefore to a controlling of the flow of fluid at the cooled temperature.

Figure 8:
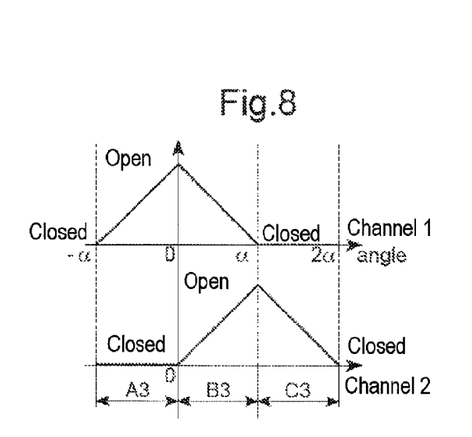
FIG. 8 is a schematic view of the operation of the invention in a third embodiment.
Figure 9:
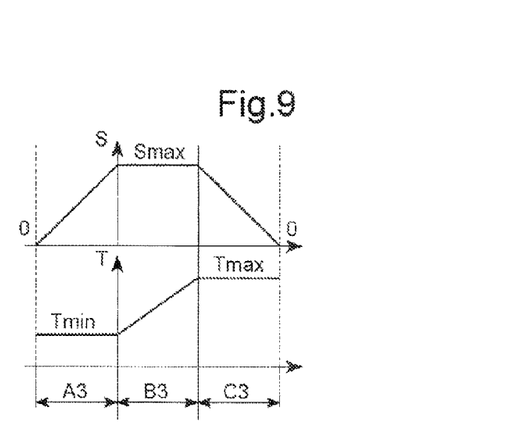
FIG. 9 shows the evolution of the cross section of the double throttle and of the temperature of the intake fluid in the embodiment of FIG. 8.

With reference now to FIGS. 8 and 9, the relative evolution of the positioning of the two flaps in the third embodiment can be seen.

In this embodiment, the actuator motor is able to drive the gearwheels in a rotation of size −α in one direction and in a rotation of size 2α in the other direction, relative to the rest position of the flaps. As in the two previous cases, the flap 10 of the first channel 3 is open in this rest position, whereas the flap of the second channel 4 is closed.

A rotation of the gearwheels by the angle −α, shown by the branch A3 in the figures, drives a closure of the flap of the first channel, whereas the flap of the second channel remains closed. By contrast, a positive rotation of the gearwheels by an angle +α, represented by the branch B3, drives a closure of the flap of the first channel and simultaneously an opening of the flap of the second channel. Lastly, the continuation of the rotation by a second angle α, represented by the branch C3, drives a closure of the flap of the second channel, the flap of the first channel remaining closed. It can be seen that the branches B3 and C3 are identical to branches A1 and B1 of the first embodiment.

As before, FIG. 9 describes on the one hand the impact of these movements on the effective area of the throttle for the passage of the intake fluid in the two channels, and therefore on the controlled flow, and on the other hand the influence that these have on the temperature of the fluid at the entry into the cylinders, downstream of the confluence of the two channels. It can be seen that the branch A3 corresponds to a controlling of the fluid that passes through just the first channel 3. By selecting the cooled channel for this channel, the temperature obtained remains constant and equal to that obtained at the output of the cooler since all the fluid passes via this cooled channel. The branch B3 corresponds to a regulation of the temperature of the fluid, without controlling of the volume thereof. Lastly, the branch C3 corresponds to a controlling of the flow over just the second channel and therefore to a controlling of the flow of fluid at the uncooled temperature.

Figure 10:
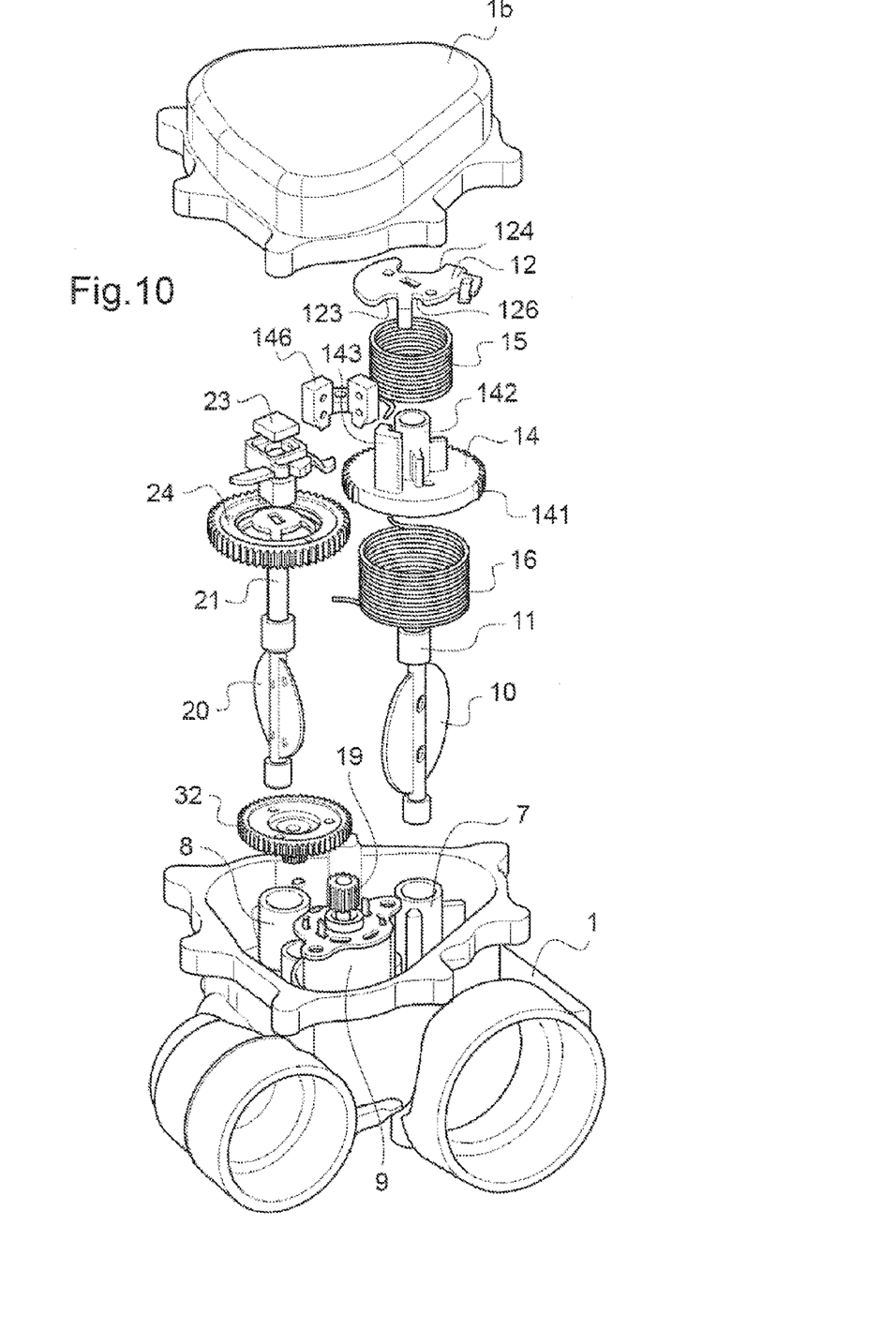
FIG. 10 is an exploded view of an embodiment of a double throttle in accordance with the first embodiment.

FIG. 10 shows an exploded view of a double throttle in a first embodiment, with the elements that form it enclosed in the body 1 by the cover 1b thereof.

The electric motor 9, by means of its pivot spindle 19, actuates an intermediate gearwheel 32, which cooperates with a second gearwheel 24 belonging to the second channel 4, which in turn cooperates with a first gearwheel 14 belonging to the first channel 3. These first and second gearwheels, in the kinematic of the double throttle, are the elements that actuate, directly or indirectly, the first and second flaps of the two channels.

The device for controlling the first channel 3 comprises a first flap 10, which is rotatable about its spindle 11, of which the lower end is intended to turn in the spindle support 7 of the body of the throttle. The upper end carries a first coaxial upper plate 12, to which the upper end is rigidly fixed, such that a rotation of this upper plate triggers a rotation of equal magnitude of the flap 10. The spindle 11 additionally supports, via a bearing 142, the first gearwheel 14, which is freely rotatable about this spindle and which acts on the first plate 12 so as to turn the first flap 10 in accordance with the principle which will be explained below.

The gearwheel 14 has the form of a disk having teeth over the majority of the circumference of its outer face 141 so as to be drivable in rotation via the corresponding circumference of the second gearwheel 24. At its center, it comprises a cylindrical tube 142, extending axially, which forms a bearing for the spindle 11 of the first flap 10 for controlling the flow of the first channel. Lastly, at its periphery, the gearwheel comprises a drive finger 143, which extends axially and which cooperates with a first stop 123, which is arranged on the periphery of the first plate 12. To drive the first flap 10 and so as to also contribute to the return thereof and position the flap in a rest position, in which it is fully open, a first spring 15 is positioned between the first gearwheel 14 and the first plate 12. The ends of said spring are inserted into grooves formed on the periphery of the two aforementioned parts so as to ensure a return in rotation of the first plate 12 in the direction of said rest position. A fixed stop 146 of the first flap is also formed on the body 1 of the double throttle so as to limit the rotation of the first plate 12 by means of cooperation of this first fixed stop with a protrusion 124 positioned on the periphery of the plate. The first plate 12 also has a dead range 126 enabling the compression of the first spring 15 thanks to the rotation of the drive finger 143, the first plate being stationary as a result of the contact between the protrusion 124 of the first plate 12 and the fixed stop 146 of the first channel.

A second return spring 16 is positioned in parallel between the first gearwheel 14 and a spring fixed stop (visible in FIG. 11), which is also positioned on the body 1 of the double throttle, so as to force the return of the first gearwheel 14 into a rest position, in which the first flap 10 is fully open. As already mentioned, in accordance with the invention, this fully open rest position makes it possible to ensure the safety of the engine of the vehicle by sending cooled intake fluid into the cylinders in the event of a failure, in particular if this failure of the actuator motor 9 corresponds to a case of intensive use of the motor vehicle.

Similarly, the device for controlling the second channel 4, shown in the form of the uncooled channel, comprises a second flap 20, which is rotatable about its spindle 21, of which the lower end is intended to turn in the spindle support 8 of the body 1 of the double throttle. The upper end carries the second gearwheel 24, to which the upper end is rigidly fixed, such that a rotation of this second gearwheel triggers a rotation of equal magnitude of the flap 20. A rotation of the actuator motor 9, of such a magnitude that the second gearwheel 24 performs a half-turn under the action of the intermediate gearwheel 32, drives the opening then the reclosure of the second flap 20, with a return of the flap and a switchover of its face that is opposite the intake fluid in the fully closed position. Fixed stops (not shown) positioned on the body of the throttle can be added to limit the rotation of the second gearwheel beyond the fully closed positions and so as to prevent the second flap from exceeding these positions and then creating leaks over the second channel when it is sought to seal this channel. The device for controlling the second channel is completed by a device 23 for measuring the angular position of the second gearwheel and of the second flap 20. Such a device is conventionally formed by a magnet associated with a magnetic sensor of the Hall effect type. The information measured by this sensor is transmitted to the ECU controller 103, which takes this information into account in the instruction it gives to the actuator motor 9.

Figure 11:
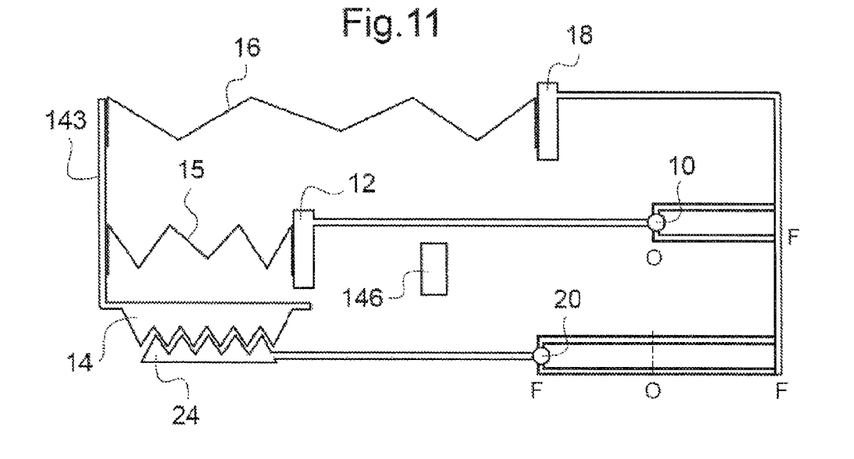
FIG. 11 is a schematic view, in a linear representation, of the positioning of the elements forming a double throttle in accordance with the first embodiment, with its flaps in the rest position and able to function in accordance with the schema of FIG. 4.

With reference now to FIG. 11, the kinematic provided to produce the graphs of FIGS. 4 and 5 of the first embodiment is shown in another illustration. This figure describes the position of the elements in the rest position, that is to say at the left-hand end of the branch A1. The position of the various elements over the branch A1 corresponds to a controlling referred to as "proportional controlling" of the intake fluid; all the points of this branch A1 correspond in fact to a controlling in variable proportions of the fluid passing into the two channels. In this figure, the position of the flaps is indicated by an "O" for open and an "F" for closed.

During the changeover from the rest position to the point at which the two branches A1 and B1 meet as a result of a rotation of the actuator motor from 0° to a, the finger 143 of the first gearwheel 14 turns by an angle α, which allows the first plate 12 to turn by the same angle under the action of the first spring 15, and which consequently allows the first flap 10 to close progressively. The first spring 15 is not compressed and remains in a prestressed position. At the same time, the second gearwheel 24, which is coupled to the first gearwheel 14, turns by the same angle α and opens the second flap 20. The second spring 16 is compressed progressively by storing energy so as to be able to return the two gearwheels and the two flaps toward the rest position. At the end of the branch A1, the first flap 10 is completely closed and the second flap 20 is completely open. As indicated before, the kinematic of the two flaps is designed a priori so as to maintain a constant flow for both channels 3 and 4 for all the points of the branch A1.

The branch B1, over the course of which the position of the actuator motor 9 passes from a to 2a, corresponds to a progressive closure of the second flap 20 of the second channel 4, the flap of the first channel remaining closed. This branch corresponds to a controlling of the intake fluid over just the second channel 4 via the rotation of the second gearwheel 24, the first channel 3 remaining sealed by the first flap 10. The first gearwheel 14 also turns, however the first plate 12 no longer turns due to the fact that it is blocked against the fixed stop of the first channel 146. The first spring 15 is compressed over this branch due to the rotation of the first gearwheel 14, whereas the first plate 12 no longer turns. The second spring 16 continues its compression due to the fact that one of its ends is connected to the rotation of the two gearwheels with respect to the body 1 and the other of its ends is immobilized by the spring fixed stop 18. The energy stored by these two springs will allow the return of the two flaps to the rest position when the actuator motor 9 is brought back to its neutral position or in the case of failure by a loss of the control of the flaps. In addition, the closure of the second channel 4 by the second flap 20 is performed by a rotation of this second flap by an angle 2α, close to 180°, which means that the second flap has itself returned from its rest position to its position at the end of the branch B1.

It should be noted that the kinematic of a double throttle in this first embodiment of the invention makes it possible, by the progressive rotation in just one direction of a single actuator motor, to control simultaneously the intake fluid over the two channels (branch A1) by selecting the distribution between the two channels, or to control over just one channel (branch B1). The double throttle makes it possible over the branch B1 to control the intake fluid sent to the cylinders at a constant temperature, here the temperature of the uncooled fluid. In the throttle according to this first embodiment, the electric motor generates a rotational torque that acts only in one direction in order to reach the desired position. The phase of return to its initial position is performed without further torque, which makes it possible to overcome the frictional resistances. The various elements of the kinematic return to their initial position under the action of the return springs 15 and 16.

Figure 12:
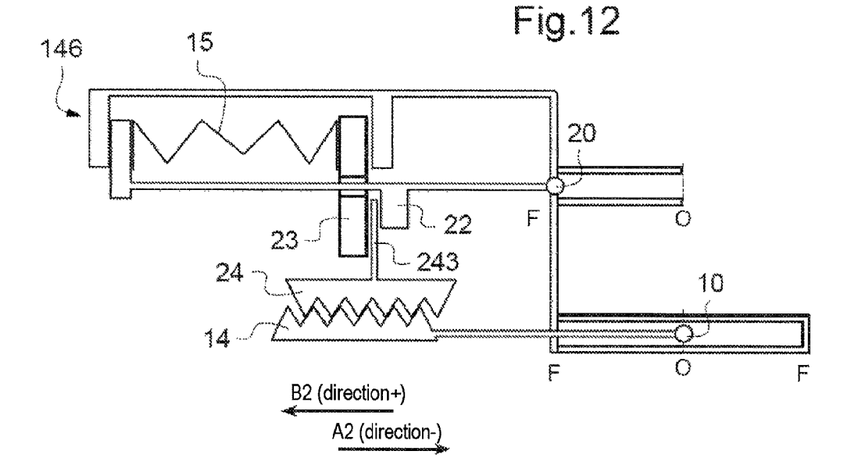
FIG. 12 is a schematic view, in a linear representation, of the positioning of the elements forming a double throttle in accordance with the second embodiment, with its flaps in the rest position and able to function in accordance with the schema of FIG. 6.

With reference now to FIG. 12, the kinematic provided to produce the graphs of FIGS. 6 and 7 of the second embodiment is shown. FIG. 12 describes the position of the elements in the rest position, that is to say at the point at which the two branches A2 and B2 meet. The position of the various elements over the branch A2 corresponds to that of the controlling referred to as "proportional controlling" of the intake fluid, that is to say to the delivery of a constant total flow.

During the changeover from the rest position to the end position of the branch A2 as a result of a rotation of the actuator motor 9 from 0° to −α, the finger 243 of the second gearwheel 24 turns by an angle −α, which drives the progressive opening of the second flap 20. The first gearwheel 14, which is coupled to the second gearwheel 24, turns at the same time by the same angle −α, and the first flap 10 closes. The spring 15 is compressed progressively by storing energy so as to allow the return of the two gearwheels and of the two flaps to their rest position. At the end of the branch A2, the first flap 10 is completely closed and the second flap 20 is completely open.

The branch B2, over the course of which the actuator motor passes from 0° to +α, corresponds to a progressive closure of the first flap 10, the second flap 20 remaining closed. This branch corresponds to a controlling of the intake fluid over just the first channel 3 via the rotation of the first gearwheel 14, the second channel 4 remaining sealed by the second flap 20. The second gearwheel 24 turns, driving the first gearwheel 14, the first flap 10 and the plate 23 of the first flap, but the plate 22 of the second channel does not turn due to the fact that it remains blocked against a fixed stop of the second channel 146. The first spring 15 is compressed over this branch due to the rotation of the second gearwheel 24, whereas the corresponding plate 22 does not turn. The spring 15 is compressed, and the energy stored will allow the return of the two flaps to the rest position when the actuator motor 9 is brought back to its neutral position or else in the case of failure by a loss of the control of the flaps. It is noted again that the closure of the first channel 3 results from a rotation of the first flap 10 having a magnitude of 2α, close to 180°, which means that this first flap has itself returned between the end positions of two branches A2 and B2.

Figure 13:
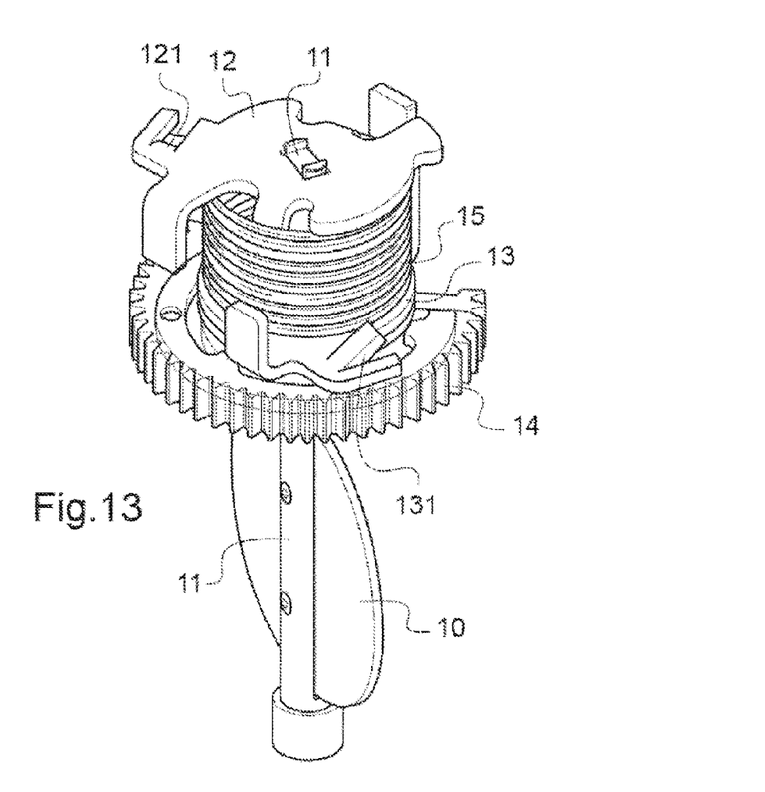
FIG. 13 is a perspective view of a flap of the double throttle in accordance with the third embodiment and of the control device of said flap.

FIG. 13 shows a flap 10 and its control device for a double throttle in the second and third variants of the invention, these components being intended for an uncooled channel 4 for the second variant and for a cooled channel 3 for the third variant. The flap 10 is mounted on its spindle 11, of which the lower end is intended to turn in the spindle support 7 of the throttle. The flap is thus rotatable relative to the body 1. The upper end carries a first upper plate 12, to which the upper end is rigidly fixed such that a rotation of this upper plate triggers a rotation of equal magnitude of the flap 10. A lower plate 13, which is freely rotatable about the spindle and which, as a result, is not driven by rotation of the upper plate 12, is also mounted on the spindle 11. Lastly, the spindle 11 carries a gearwheel 14, which is freely rotatable about said spindle, said gearwheel making it possible to drive one or other or both of the two plates in accordance with a principle which will be explained further below. The gearwheel 14 is driven, in one direction or the other, by a pinion mounted on the output spindle of the electric motor controlled by the ECU 103. It is this gearwheel that is the element which actuates the two plates and, ultimately, positions the flap 10.

A first rotation return spring 15 is positioned between the two first upper 12 and lower 13 plates and tends to turn the two plates in opposite directions. To do so, each plate comprises a groove, denoted by 121 and 131 respectively, which forms a seat into which slots the corresponding end of the return spring 15, and which transmits to the corresponding plate the force exerted by the spring.

Figure 14:
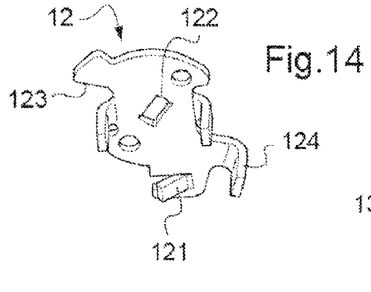
FIGS. 14, 15 and 16 are perspective views of three elements of the control device of FIG. 13, more specifically of an upper plate, a lower plate and a drive gearwheel respectively.
Figure 15:
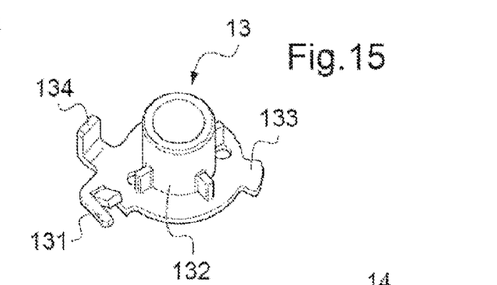

The upper plate 12 and lower plate 13 will now be described in relation to FIGS. 13 to 15. Whereas the upper plate 12 has a slot 122 of the mortise type, in which a tenon carried by the spindle 11 will be inserted so as to secure this plate to this spindle, the lower plate 13 comprises a tubular bearing 132 in which the spindle 11 can turn freely. Thus, both the securing of the upper plate 12 to the spindle and the free rotation of the lower plate 13 relative to this spindle are ensured at the same time. Each of these two plates also comprises two protrusions extending radially so as to form simultaneously a short upper stop 123 and a short lower stop 133 respectively and a long upper stop 124 and a long lower stop 134 respectively, which are intended to form limits to the rotation of these plates with respect to surrounding parts. The long stops 124 and 134 are intended to limit the rotation with respect to the body of the double throttle 1 by cooperating with fixed stops positioned on this body, whereas the short stops provide support for the driving of the plates and/or the compression of the spring 15 by the gearwheel 14. The angular position of these stops, both short and long, is defined so as to adapt the position of the flap to the case of operation in question for the engine.

Figure 16:
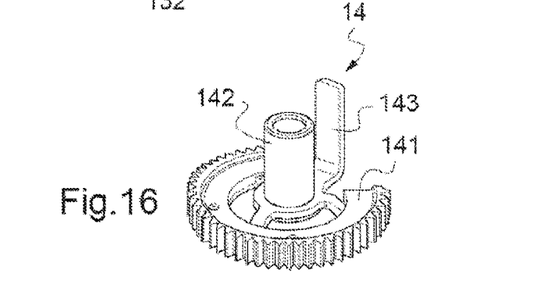

With reference to FIG. 16, the gearwheel 14 has the shape of a disk having teeth over the majority of the circumference of its outer face 141 so as to be able to be driven in rotation by the pinion of the motor for actuating the double throttle 1. At its center, the gearwheel comprises a cylindrical tube 142, extending axially, which forms a bearing for the spindle 11 of the flap for controlling the flow passing via the channel in question. Lastly, at its periphery, the gearwheel comprises a drive finger 143, which extends axially and which is intended to cooperate with the short upper stop 123 and short lower stop 133 of the two plates 12 and 13 of the first channel. The radial distance of the gearwheel to the spindle 11 is thus substantially equal to that of the short stops of the two plates so as to ensure the driving of these plates. By contrast, this distance is smaller than that between the long stops so as to be able to pass in front of said stops at the corresponding angular section and thus allow the rotation of the gearwheel to continue without interfering with the fixed stops, which are intended for the long stops of the plates.

The second channel, corresponding to the uncooled channel 4, comprises a control device similar to that described for the first channel 3 and illustrated in FIG. 13, apart from the fact that it comprises just one upper plate, referred to as a second upper plate 22, and does not comprise a lower plate. The finger 243 of the second gearwheel 24, said finger being similar to the finger 143 of the first gearwheel 14, then cooperates only with a short upper stop of the second upper plate 22, which is similar to that 123 of the first channel. In this configuration, the return spring 25 of the second channel is carried at its ends on the one hand via a groove positioned on the second upper plate and on the other hand via a fixed stop, which is positioned on the body of the double throttle.

In the description of this third embodiment, the pinion of the actuator motor meshes directly with one of the two gearwheels, the second meshing with the first and thus turning in an opposite direction. This embodiment could also be implemented with a pinion that meshes with the two gearwheels, which would then turn in the same direction, the drive kinematic of the second flap being adapted consequently. Likewise, it is clear that the first channel can be selected as being the uncooled channel, which would then comprise two plates, the second channel then being the cooled channel, which would then comprise just a single plate.

Figure 17:
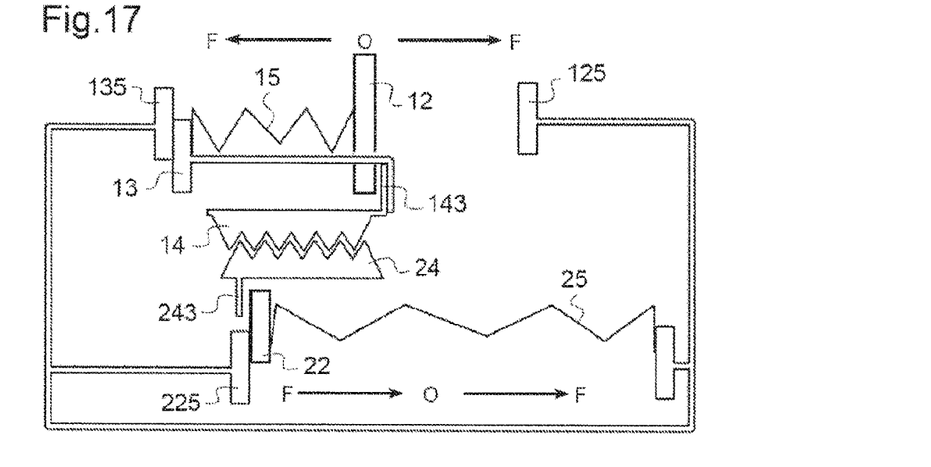
FIG. 17 is a schematic view, in a linear representation, of the positioning of the elements forming a double throttle in accordance with the third embodiment, with its flaps in the rest position and able to function in accordance with the schema of FIG. 8.

With reference now to FIG. 17, the kinematic provided to produce the graphs of FIGS. 8 and 9 of the third embodiment is shown in a further illustration. This kinematic is illustrated here in the rest position, that is to say the position assumed by the upper plate 12 and lower plate 13 of the first channel 3 as well as by the upper plate 22 of the second channel 4 in the case of an absence or loss of drive by the actuator motor. This position also corresponds to the point at which the branches A3 and B3 meet, which is plotted on the ordinate. In the figure, the plates 12, 13 and 22 are illustrated by rectangles, and the state of the flaps corresponding to the positioning of the plates is indicated by an "O" for open and an "F" for closed. Here again, in this rest position, the flap 10 of the first channel is open, whereas the flap of the second channel 4 is closed.

The position of the various elements over the branches A3 or C3 correspond to a controlling in variable proportions of the fluid passing into one of the two channels, whereas the branch B3 corresponds to a proportional controlling of the intake fluid. FIG. 17 also shows, by arrows, the movements that these elements are likely to perform in response to being moved by the actuator motor 9.

The branch A3, in which the actuator motor passes from 0° to −α, consists in a progressive closure of the flap 10 of the first channel 3 from its rest position, which corresponds to a fully open position. The finger 143 of the first gearwheel 14 drives the upper plate 12 of the first channel by compressing the first spring 15. The lower plate 13 is held in place by the lower fixed stop 135 of the body of the throttle, which prevents the rotation of said lower plate and allows the compression of the first spring 15. The second channel is not affected during this branch A3, the second spring 25 being in its prestressed position and the second upper plate 22 being in its rest position, pressed against the second fixed stop 225 under the action of said second spring 25.

Over the branch B3, in which the actuator motor passes from 0° to α and which corresponds to a proportional controlling of the intake fluid, the finger 143 of the first gearwheel 14 pushes the lower plate 13 and progressively closes the first flap 10. It does not compress the first spring 15, which remains in a prestressed position, whereas the first upper plate 12 does not come into contact with the upper fixed stop 125 and drives the first upper plate 12. At the same time, the second finger 243 progressively opens the second channel 4 by pushing the second upper plate 22 and subsequently the second flap 20. The second spring 25 is compressed progressively, unlike the first spring, which remains in a prestressed state over the entire length of the branch B3. At the end of the branch B3, the first flap 10 is completely closed and the second flap 20 is completely open.

Lastly, over the branch C3, in which the actuator motor passes from α to 2α and which corresponds to a controlling over just the second channel 4, the second upper plate 22 is displaced under the action of the second spring 25. The finger 243 of the second gearwheel 24 drives the short stop 223 of the second upper plate and subsequently the flap of the second channel, which closes progressively. At the same time, the first upper plate 12 remains in abutment against the first fixed stop 125, and the compression of the first spring 15 rises due to the fact that the first lower plate 13 is driven in rotation by the first finger 143, whereas the first upper plate 12 is stopped. The compressions of the two springs 15, 25 are added together.

Figure 18:
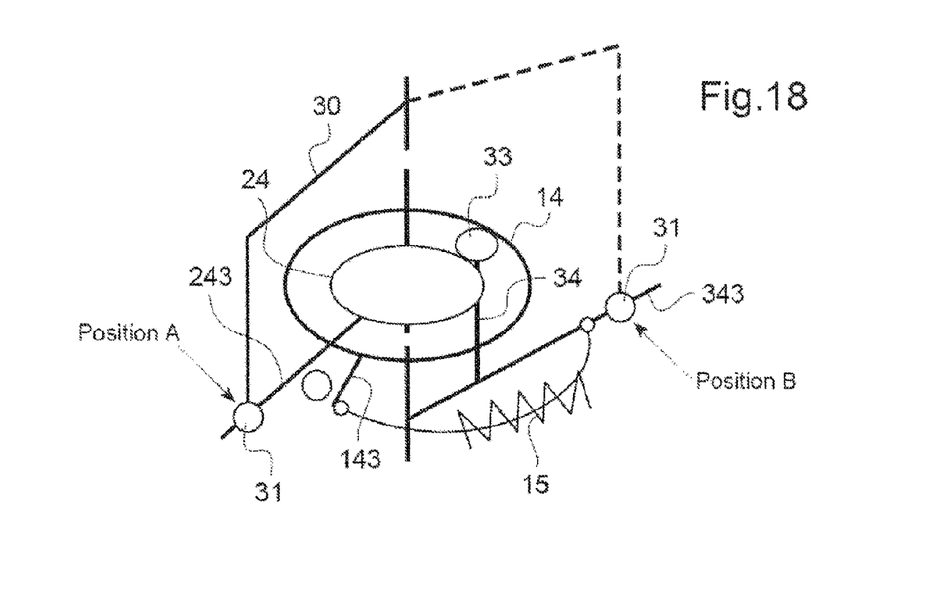
FIG. 18 is a schematic perspective view of elements forming a double throttle provided in accordance with a variant of the third embodiment.
Figure 19:
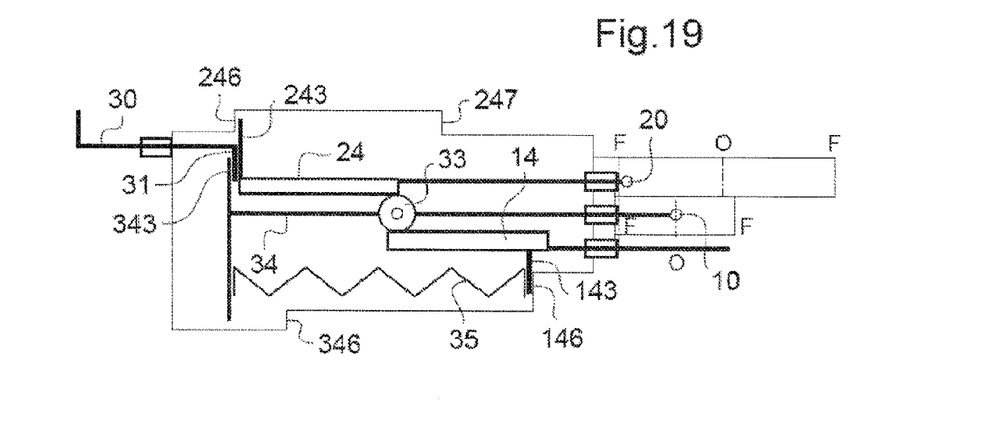
FIG. 19 is a schematic view, in a linear representation, of the positioning of the elements forming a double throttle in accordance with the variant of the third embodiment, with its flaps in the rest position and able to also function in accordance with the schema of FIG. 8.

With reference now to FIGS. 18 and 19, a variant of the third embodiment will be described, which is characterized by the presence of a single spring and the presence of an epicyclic gear train on the basis of the two gearwheels. In this embodiment, the actuator motor does not drive the gearwheels directly, but acts via an actuator 30, which rotates a planetary pinion which meshes with the gearwheels, that is to say rotates the gearwheel of one of the two channels in the direction opposite to the previous direction. In addition, the flaps are driven—for the first channel via the planet carrier spindle and for the second channel directly by the gearwheel acted on directly by the actuator. The elements of this variant of the third embodiment having the same function as in the first variant bear the same reference number and will not be described again.

FIG. 18 is a schematic perspective view of the device, whereas FIG. 19 is a plan view of the same device. In FIG. 19, the device is shown in the rest position, that is to say the portion in which the flap 10 of the first channel is open and that of the second channel is closed. The positioning is thus similar to that of FIG. 11 in the first variant, that is to say similar to the transition between the branches A3 and B3.

The first gearwheel 14 functions as the annular gear of an epicyclic gear train, whereas the second gearwheel 24 functions as the sun gear of this train. A planet gear 33, connected in rotation to a planet carrier 34, is housed between these two gearwheels and ensures the combined drive thereof. A driver 30, actuated by the actuator motor (not shown), is rotatable about the spindle of the epicyclic gear train and has a lug 31, for driving primarily the finger 243 of the second gearwheel and secondly a third finger 343 carried by the planet carrier 34. The lug is shown in FIG. 18, by means of a solid line and a dashed line, in the two positions A and B, in which it engages, respectively, the finger 243 of the second gearwheel and the finger 343 of the planet carrier. A return spring 35 tends to push away the finger 343 of the planet carrier 34 from the finger 143 of the first gearwheel and to return the planet holder to its 'rest' position.

Lastly, the body 1 of the double throttle comprises a certain number of fixed stops, which will be detailed further below, against which the fingers of the gearwheels and the finger of the planet carrier press so as to operate the epicyclic gear train and allow two of the elements thereof to turn, whereas the third is stopped.

In the position −α, corresponding to the end position of the branch A3 and the closed position of the two flaps, the actuator 30 is in a fully retracted position, which is associated with a fully closed position of the flap 10 of the first channel 3. At the same time, the second gearwheel 24 is in a position in which the flap of the second channel 4 is also closed; this position is defined by the placement against a first fixed stop 246 of the second channel, which is formed on the body of the double throttle 1. Along the entire length of the branch A3, the finger 243 of the second gearwheel 24 remains in contact with this first fixed stop of the second channel 246, and the second flap 20 consequently remains closed. The flap 10 of the first channel, by contrast, follows the movement of the planet carrier 34 and closes progressively along this branch A3 by passing from the position 0° to −α, thus ensuring controlling over just the first channel 3. With regard to the first gearwheel 14, positioned as an annular gear of the epicyclic gear train, it is driven in rotation by the gearwheel 33 of the planet carrier 34, since the planet gear 24 is blocked by the first fixed stop 246 of the second channel. It is not stopped along the entire length of the branch A3. The spring 35, by contrast, undergoes a first compression due to the fact that the planet carrier 34 turns less quickly than the annular gear 14 of the epicyclic gear train; this compression ensures the possibility of return of the planet carrier 34 to the rest position when the driver 30 is relaxed or is returned to the position 0°.

In the rest position, corresponding to a rotation to 0° of the actuator and illustrated in FIG. 19, the second finger 243 is still stopped against its first fixed stop 246, as already mentioned, whereas the lug 31 of the actuator 30 is in contact with this second finger 243. The third finger 343 is also in contact with the lug 31, being returned to this position under the action of the return spring 35. The position of the actuator 30 corresponds to a position of the planet carrier 34 in which the flap 10 of the first channel 3 is open. The second channel 4 is still in the closed position, and the finger 143 of the first gearwheel abuts against its fixed stop 146.

Along the entire length of the branch B3, that is to say during a rotation of the actuator motor from 0° to α, the finger 143 of the first gearwheel remains in abutment against its fixed stop 146. The extension of the actuator 30 pushes the second gearwheel 24, thus opening the second channel; at the same time, under the action of the second gearwheel acting as a sun gear, the planet carrier 34 is driven in rotation, which ensures the closure of the flap 10 of the first channel. The sought proportional controlling and the constancy of the flow of intake fluid over both channels are thus achieved. At the end of the branch B3, the actuator 30 is sufficiently displaced so that the planet carrier 34, under the action of the return spring 35, comes against a fixed stop of the planet carrier 346, which corresponds to a fully closed position of the first channel 3. The second gearwheel is in an intermediate position between its first stop of the second channel 246 and a second stop of the second channel 247, explained further below, which corresponds to the fully open position of the second flap 20.

The branch C3 corresponds to an even greater extension of the actuator 30 due to a rotation of the actuator motor from α to 2α. The planet carrier 34 remains blocked by its fixed stop 346, and the epicyclic gear train generates a simultaneous rotation of the two gearwheels. The actuator 30 fully returns the second gearwheel 24 by its lug 31 and progressively closes the flap of the second channel 4, whereas the first channel 3 remains closed, thus ensuring the controlling of the intake fluid over just the second channel. This progression continues until the second finger 243 meets the second stop of the second channel 247, which is formed in the body of the double throttle 1. The position of this second stop corresponds to the fully closed position of the second flap 20, thus making it possible to exceed this fully closed position. With regard to the first gearwheel 14, this is rotated by the epicyclic gear train and compresses the return spring 35 so as to allow the return of the second gearwheel 24 over the branch C3 when the actuator 30 is retracted again.

Lastly, this second variant reproduces the same pattern of opening and closure of the flaps of the two channels 3 and 4 as the first variant, as is illustrated in FIGS. 8 and 9.

In all the described embodiments, the invention is characterized by a kinematic that, in the rest position, places the flap 10 of the first channel 3 in a fully open position and the flap 20 of the second channel 4 in a fully closed position.

The position assumed by each of the two flaps in the rest position makes it possible to ensure the safety of the engine of the vehicle by sending, in the case of a failure, cooled intake fluid into the cylinders (first channel open) and only cooled fluid (second channel closed). Such a position of the flaps guarantees that the engine of the vehicle is made safe by the double throttle, even if this failure of the actuator motor 9 occurs during intensive use of this engine of the vehicle.

It should also be noted that the throttle has been presented above as being arranged upstream of the cooler and having one input and two outputs. In a variant, it could of course be arranged downstream. It would then have two inputs and one output, the output being in communication with the intake pipes of the engine.

The device according to the invention may comprise at least one position sensor configured to measure the angles of aperture of the flaps. In particular, the sensor may be configured to measure the position of the flap of the channel subjected to a controlling of the intake fluid. For example, in the first embodiment, a position sensor may be configured to measure the position of the second flap 20 of the second channel 4. In the second embodiment, a position sensor may be configured to measure the position of the first flap 10 over the first channel 3. In the third embodiment, a position sensor may be configured to measure the positions of the first flap 10 and second flap 20 over the first channel 3 and second channel 4.

The invention claimed is:

1. A device for feeding intake fluid for an internal combustion engine, said device comprising:
    a throttle, equipped with a throttle body in which a first channel and a second channel for circulating said intake fluid are arranged, in which first and second movable sealing flaps are positioned for controlling the flow passing through said circulation channels, said throttle further comprising a motor for actuating said flaps and a kinematic able to actuate the first flap and/or the second flap in response to a rotation of said motor,
    a cooler connected to one of the first and second circulation channels of the throttle, referred to as the cooled channel,
    said device being configured to connect the other circulation channel of the throttle, referred to as the hot channel, to the heat engine without passing through the cooler,
    wherein the kinematic ensure, in case of loss of actuation of the flaps by the actuator motor, that said flaps are switched to a rest state, the flap of the cold channel then being in a fully open position and the flap of the hot channel then being in a fully closed position.

2. The device as claimed in claim 1, wherein the kinematic ensures that, starting from said rest position and in response to a rotation in a first direction of said drive motor, the cold channel is closed simultaneously with an opening of the hot channel, thus providing 'proportional' controlling.

3. The device as claimed in claim 2, wherein the kinematic ensures that, in response to a continuation of the rotation in the first direction of said drive motor, the hot channel is closed whilst the cold channel is kept closed, thus providing a controlling of the intake fluid at the temperature of the hot channel.

4. The device as claimed in one of claim 2, wherein the kinematic ensures that, starting from said rest position and in response to a rotation in a second direction, opposite the first direction, of said drive motor, the cold channel is closed whilst the hot channel remains closed, thus providing a controlling of the intake fluid at the temperature of the cold channel.

5. The device as claimed in claim 2, wherein the kinematic ensures a constant total flow during said proportional controlling.

6. The device as claimed in claim 1, wherein the kinematic brings at least one of the two flaps into a closed position in accordance with two positions, one corresponding to a reversal of said flap with respect to the other.

7. The device as claimed in claim 1, wherein the actuator motor, by means of a drive pinion, drives two gearwheels meshing with one another, the drive pinion of the actuator motor meshing with one of said gearwheels, at least one first gearwheel carrying a drive finger designed to drive in rotation a first plate connected fixedly to the spindle of one of said flaps, by means of a return spring.

8. The device as claimed in claim 7, wherein said first plate comprises a dead range in its cooperation with the corresponding drive finger, said dead range corresponding to the actuation by the actuator motor of the flap driven by the second gearwheel, the flap associated with the first gearwheel remaining stationary.

9. The device as claimed in claim 1, wherein the actuator motor drives two gearwheels forming a sun gear and an annular gear for an epicyclic gear train, the rotation of the components of said epicyclic gear train being ensured by an element actuated by the actuator motor and said element acting against a single return spring carried by said throttle.

10. An air intake module for an internal combustion engine, comprising a device as claimed in claim 1.

* * * * *